United States Patent
Dey

(10) Patent No.: US 12,385,106 B2
(45) Date of Patent: Aug. 12, 2025

(54) METAL RECOVERY PROCESS

(71) Applicant: MINEX TECHNOLOGY GROUP LIMITED, Banstead (GB)

(72) Inventor: Brian Matthew Dey, South Glamorgan (GB)

(73) Assignee: MINEX TECHNOLOGY GROUP LIMITED, Surrey (GB)

( * ) Notice: Subject to any disclaimer, the term of this patent is extended or adjusted under 35 U.S.C. 154(b) by 540 days.

(21) Appl. No.: 17/634,628

(22) PCT Filed: Aug. 13, 2020

(86) PCT No.: PCT/GB2020/051941
§ 371 (c)(1),
(2) Date: Feb. 11, 2022

(87) PCT Pub. No.: WO2021/028694
PCT Pub. Date: Feb. 18, 2021

(65) Prior Publication Data
US 2022/0325375 A1  Oct. 13, 2022

(30) Foreign Application Priority Data
Aug. 14, 2019  (GB) ...................... 1911658

(51) Int. Cl.
C22B 7/00    (2006.01)
C22B 13/02   (2006.01)
C22B 15/00   (2006.01)
C22B 19/30   (2006.01)

(52) U.S. Cl.
CPC ............ *C22B 7/002* (2013.01); *C22B 13/025* (2013.01); *C22B 15/0056* (2013.01); *C22B 19/30* (2013.01)

(58) Field of Classification Search
None
See application file for complete search history.

(56) References Cited

U.S. PATENT DOCUMENTS

| | | | | |
|---|---|---|---|---|
| 2,067,874 | A | * | 1/1937 | Brown .................. C22B 23/005 |
| | | | | 423/150.5 |
| 2,290,843 | A | * | 7/1942 | Kinney ................... C22B 47/00 |
| | | | | 75/625 |
| 2,733,983 | A | | 2/1956 | Daubenspeck |

(Continued)

FOREIGN PATENT DOCUMENTS

| | | |
|---|---|---|
| GB | 533377 A | 2/1941 |
| GB | 677691 A | 8/1952 |

(Continued)

*Primary Examiner* — George Wyszomierski
(74) *Attorney, Agent, or Firm* — Epstein Drangel LLP

(57) ABSTRACT

A process for recovering a metal in the form of a metal halide from a metal-containing source is described, the process comprising the steps of: —(i) forming a solid metal halide containing product by contacting the metal-containing source with a gaseous halide in an oxidising environment and at a temperature below the vaporisation temperature of the metal halide of interest; (ii) heating the metal halide containing product formed in step (i) to a temperature at or above the vaporisation temperature of the metal halide to form a gaseous metal halide containing product; and (iii) condensing the gaseous metal halide containing product of step (ii) to recover the metal halide of interest.

9 Claims, 1 Drawing Sheet

(56) References Cited

U.S. PATENT DOCUMENTS

| | | | | |
|---|---|---|---|---|
| 2,883,265 A | * | 4/1959 | Evans | C22B 1/08 |
| | | | | 423/79 |
| 3,856,508 A | * | 12/1974 | Othmer | C21B 15/006 |
| | | | | 423/136 |
| 3,892,639 A | * | 7/1975 | Leavenworth, Jr. | C22B 23/005 |
| | | | | 205/348 |
| 2009/0047198 A1 | * | 2/2009 | Thomas | C01G 39/003 |
| | | | | 502/50 |
| 2016/0102375 A1 | | 4/2016 | Bohringer et al. | |
| 2016/0298211 A1 | * | 10/2016 | Bergeron | C01B 9/02 |

FOREIGN PATENT DOCUMENTS

| | | |
|---|---|---|
| GB | 1203967 A | 9/1970 |
| WO | 2006043065 A1 | 4/2006 |
| WO | 2010082065 A2 | 7/2010 |

* cited by examiner

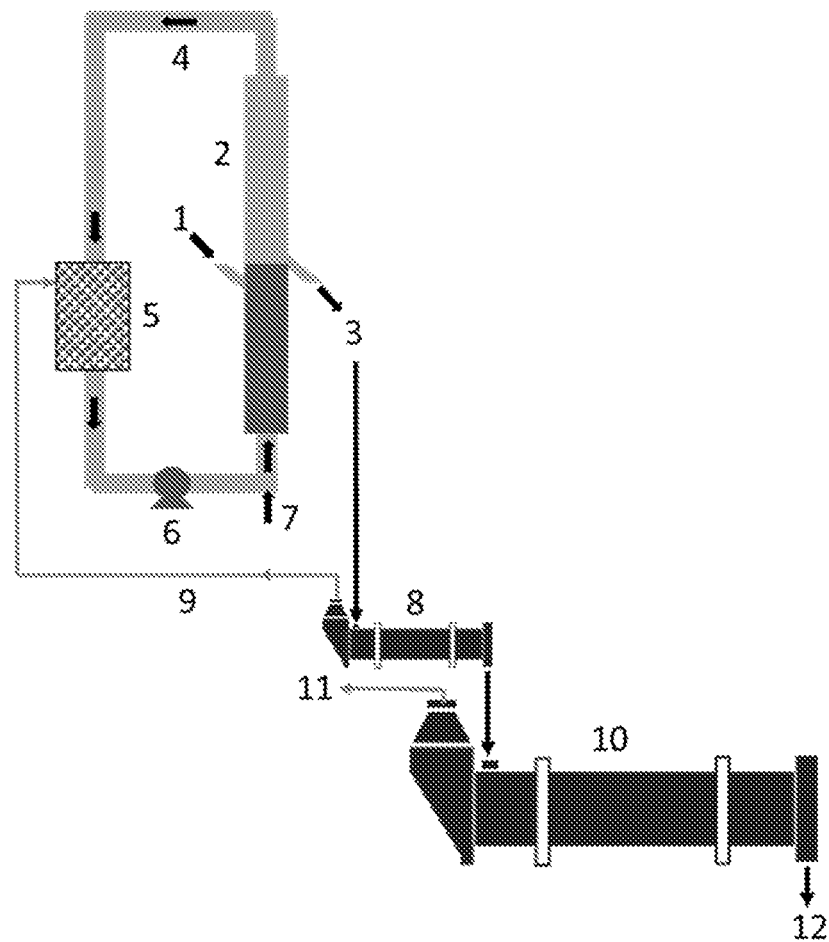

METAL RECOVERY PROCESS

The present invention relates to a process for recovering a metal of interest from a metal-containing source. More particularly, the present invention relates to a process for recovering a metal of interest in the form of a metal halide from a metal-containing source, such as a metal ore or a metalliferous waste material, using a halogenation process.

BACKGROUND OF THE INVENTION

Metalliferous ore deposits formed in the Earth's crust typically compose more than one metalliferous elements, with certain combinations of metal commonly occurring together. Lead deposits, for example, are commonly associated with zinc and lead concentrates formed at processing plants therefore often contain zinc as an impurity.

Methods for extracting metals from ores which are known in the art include cyanide leaching processes and autoclaving. Chlorination-based extraction methods involving liberating the metal in the form of its chloride have also been described, as discussed in WO 2006/043065A.

Metalliferous waste materials, such as process slag wastes produced during smelting and refining processes, also contain valuable metal containing constituents. By virtue of the high energy nature of their formation, metalliferous wastes tend to be very stable and so these metal containing constituents cannot be readily recovered in an economically viable way. Metal impurities trapped within slag wastes have not hitherto been regarded as commodities, therefore, and little attention has been paid in the art to developing methods for realising their value.

Depending on the origin of the metalliferous wastes, a wide variety of valuable metals of interest are potentially recoverable. Lead smelting wastes typically comprise zinc containing constituents, for example, as well as other valuable metals such as copper, silver, indium, gold, molybdenum, tin, gallium and indium, whereas copper smelting wastes are a potential source of nickel containing constituents.

Methods for extracting and recovering metals from source waste materials which have found application in the art include hydrometallurgical processes. Such processes are not selective, however, and indiscriminate dissolution of the waste complicates the recovery of the metal of interest from the slag waste material.

More recently, interest has been expressed in chlorination-based extraction processes in which a metal is recovered from a metal-containing source by converting the metal into a volatile metal chloride which can then be recovered and further treated to extract the metal itself.

In WO 2006/043065A mentioned above, for example, there is described a method for the extraction of precious metals from precious metal containing sources involving the steps of forming a metal containing chloride compound in the vapour phase, condensing the precious metal containing vapour phase product so as to extract the metal from its source in the form of a metal chloride and then recovering the precious metal from the condensed product. Although described as applicable to the extraction of metals from a variety of sources, metal-containing ores are preferred sources for use in the method and the extraction of gold from a complex gold ore is exemplified.

The recovery of metal containing constituents contained in slag wastes by means of a chlorination-based extraction process is described in WO 2010/082065A. As described therein, the metal containing constituents are converted into volatile metal chlorides which are then recovered and further treated to extract the metal of interest itself. The metal containing wastes are heated and the heated material contacted with a gaseous chloride, preferably hydrogen chloride, to form a gaseous metal chloride containing product from which the metal chloride is recovered and the metal extracted. Conveniently, the gaseous metal chloride containing product is treated to recover the metal chloride by quenching with water to form an aqueous solution of the metal chloride.

In the method of WO 2010/082065A, the starting solid waste material is contacted with the gaseous chloride at a temperature which is at or above the vaporisation temperature of the metal chloride to be recovered. In this way, the target metal chloride is both formed and volatilised off in a single step. Continuous formation of the metal chlorides and their separation occurs within a fluidised bed reactor heated to a temperature in the region of 700° C. to 1600° C., with temperatures in the range of 700° C. to 900° C. typically being employed.

A disadvantage of the method described in WO 2010/082065A is that it is inefficient in its use of hydrogen chloride. Hydrogen chloride gas is an expensive reagent, with current estimated reagent and power costs for hydrogen chloride gas generation from chloroalkali plant amounting to approximately US Dollars 327/tonne, so optimal hydrogen chloride usage is key to the commercial viability of the process.

In order to maximise the concentration of metal chlorides within the gas, the extraction gas should be recirculated before the metal chlorides are recovered from it. This would, however, require that the recirculation loop be maintained at the same temperature as the fluidised bed reactor, as otherwise the metal chlorides would condense out within the recirculation loop. This presents considerable technical difficulties; recirculation of the gases requires the use of a recirculation pump which not only must resist attack from the hydrochloric gas at the extremely high temperatures employed but must also cope with vaporised metal chlorides, super-heated steam (present from the water that is a by-product of the metal chloride formation) and any fines of the metallurgical waste that are mobilised by the velocity of the gas flow. To date, no commercially viable solution to this problem has been developed.

A further problem in relation to extraction gas utilisation arises with the quench stage. Hydrogen chloride gas is very soluble in water and will form concentrated hydrochloric acid at the quench stage which must subsequently be neutralised in order to release the dissolved metal chloride. Loss of hydrogen chloride gas to the quench solution during this stage and the cost of the alkali reagent required to effect the neutralisation present significant additional processing costs.

Further inefficiencies in hydrogen chloride gas utilisation arise in the method of WO 2010/082065A due to losses within the calcine waste from the fluidised bed reactor. Coming directly from the hydrogen chloride rich environment of the fluidised bed reactor, this waste contains some residual hydrochloric gas (and potentially also some residual metal chlorides), again necessitating neutralisation.

There therefore remains a continuing need for the development of further, commercially viable halogenation, particularly chlorination, based methods for recovering metals of interest from metal-containing sources, such as metal ores and metalliferous waste materials, which avoid the disadvantages associated with methods known in the art.

SUMMARY OF THE INVENTION

According to a first aspect, the present invention provides a process for recovering a metal in the form of a metal halide from a metal-containing source, the process comprising the steps of: —
(i) forming a solid metal halide containing product by contacting the metal-containing source with a gaseous halide in an oxidising environment and at a temperature below the vaporisation temperature of the metal halide of interest;
(ii) heating the metal halide containing product formed in step (i) to a temperature at or above the vaporisation temperature of said metal halide to form a gaseous metal halide containing product; and
(iii) condensing the gaseous metal halide containing product of step (ii) to recover the metal halide of interest.

Also provided is a process for recovering a metal of interest from a metal-containing source comprising recovering the metal in the form of a metal halide from the metal-containing source according to the first aspect of the invention and then extracting the metal from the metal halide.

The present invention is based on the finding that metals may be extracted and recovered from a metal-containing source in the form of a metal halide in a cost effective way, with savings in operational and capital equipment costs compared, for example, to existing chlorination methods. The present invention involves forming a metal containing halide in the solid phase, heating the solid metal halide product to a temperature at or above the vaporisation temperature of the metal halide to produce a gaseous metal halide and then condensing the gaseous metal halide compound to recover the metal halide of interest.

In particular, the present inventors have found that carrying out metal chloride formation and volatilisation steps in separate stages, rather than forming and volatilising the metal chloride in a single step as in the method of WO 2010/082065A, affords significant commercial advantages. Not only does this lead to improved utilisation of the gaseous chloride reagent but also minimises gaseous chloride losses. This, in turn, leads to savings in operational costs. Capital costs are also reduced due to the corresponding reduction in the size of the industrial plant needed to produce the gaseous chloride for the process.

DETAILED DESCRIPTION OF THE INVENTION

The process of the invention is applicable to the recovery of metals in the form of their halides from a variety of sources, including ores and metalliferous waste materials produced by mining processes. Suitable waste materials include slag waste from lead, copper or zinc smelting or refining processes or other such waste materials containing sufficiently high levels of recoverable metal containing constituents of interest to be of economic interest.

The nature and levels of potentially recoverable metal containing constituents in metalliferous waste materials will vary depending on the origin of the slag waste. Slag wastes from lead smelting processes commonly comprise zinc containing constituents, typically in the form of oxides and silicates for example. Other valuable metals which are commonly found in lead smelter slags include copper, silver, indium, gold, molybdenum, tin, gallium and germanium. As copper deposits are commonly associated with nickel, copper smelter slags are a useful potential source of nickel compounds. The method of the present invention therefore affords the possibility of recovering a wide variety of valuable metals of interest.

The gaseous halide for use in the process according to the invention may suitably be any halide which ordinarily occurs in gaseous form or one which is readily volatilised. Any conventional halide, such as a chloride, fluoride, bromide or iodide, may be employed.

In one embodiment the gaseous halide for use in the process according to the present invention is a gaseous chloride, suitably a chloride which ordinarily occurs in gaseous form such as hydrogen chloride or a chloride which is readily volatilised such as ammonium chloride or iron (III) chloride.

In one particular embodiment, the gaseous chloride is hydrogen chloride gas.

Hydrogen chloride gas for use in the process of the invention may conveniently be prepared by conventional methods, for example by electrolysis of a brine solution to produce hydrogen and chlorine gases which are then combined to produce hydrogen chloride gas. A commercially useful by-product of this process is sodium hydroxide, the preparation of which represents another aspect of the invention.

In one embodiment, the hydrogen and chlorine gases are combined to produce hydrogen chloride gas prior to contacting the metalliferous waste material. In another embodiment, hydrogen chloride gas is formed by the degradation of chemicals and subsequently contacted with the metal-containing source.

Conveniently, the solid metal halide containing product of step (i) of the process of the invention is formed by bringing the metal-containing source with a stream of the gaseous halide, for example a gaseous chloride, in a suitable reaction vessel such as a fluidised bed reactor or rotary kiln.

In one embodiment, the reaction vessel is a fluidised bed reactor. Suitably the fluidised bed will be maintained with compressed air to ensure a homogenous bed.

In order to optimise the amount of metal halide containing product formed per unit of gaseous halide consumed, it will be appreciated that the stream of gaseous halide may suitably be recirculated within the reaction vessel.

The process to form the metal halide containing product may be conducted in batch mode, by intermittently contacting the gaseous chloride with the metalliferous waste material.

In one embodiment, the process to form the metal halide containing product may be conducted continuously, for example by continuously replenishing the supply of gaseous halide and the supply of metalliferous waste material in the reaction vessel.

Forming the metal halide by contacting the metal-containing source with the gaseous halide at a temperature below the vaporisation temperature of the metal halide of interest, as in step (1) of the process of the present invention, means that the metal halide remains in the solid phase rather than becoming volatilised as in the prior art processes discussed above. This offers considerable processing advantages as the metal halides so formed remain stable and can subsequently be extracted outside of a gaseous halide enriched environment, affording the possibility of reduced operational costs by improving utilisation of the gaseous halide reagent and minimising gas losses.

It will be appreciated that where there is more than one recoverable metal of interest present in the metal-containing source material, the temperature at which the metal-containing source and gaseous halide are brought into contact should be below the vaporisation temperature of the most volatile of the formed metal halides.

Typically, where the gaseous halide is a gaseous chloride, temperatures in the range of 100° C. to 350° C., suitably 300° C. to 350° C., are employed. In one embodiment, the metal-containing source material and gaseous chloride are brought into contact at a temperature in the range of 320° C. to 350° C.

Where the metal-containing source material comprises iron as well as other metals of greater interest, the present inventors have found that the selectivity of the recovery of the metals of greater interest can be improved when a metal chloride is formed at a temperature of above 316° C.

Iron (III) chloride, formed by reaction of iron present in the metalliferous source material with the gaseous chloride, is not stable above its boiling point of 316° C., decomposing above this temperature to form an iron (III) oxide which condenses out and releases hydrogen chloride. By carrying out the metal chloride formation step of the process of the present invention at a temperature above 316° C., therefore, no hydrogen chloride gas is lost to the iron, rendering the metal chloride formation stage more selective.

In another embodiment, therefore, the metalliferous source material and the gaseous chloride are brought into contact at a temperature of greater than 316° C., suitably at a temperature in the range of greater than 316° C. but no more than 350° C.

It will be appreciated that in the case when the gaseous halide is other than a chloride, the boiling point of the iron (III) halide and, correspondingly, the lower limit of the temperature range in which loss of volatilised iron (III) halide is avoided, would be different. Boiling points for other halides are conventionally known in the art and are readily accessible in the literature.

In principle, the metal halide formation step could be carried out at a temperature as low as room temperature but in this case, water formed as a by-product of the metal halide formation will remain with the formed metal halides. The presence of water has a detrimental effect on the efficiency of gaseous halide utilisation as the gaseous halide reacts with the water to form the halogen acid (for example hydrochloric acid in the case of gaseous chloride), leading to loss of gaseous halide. In addition, dry recovery of the metal halide is not an option where water is present.

Conveniently, therefore, the gaseous halide and metal-containing source material are contacted together at a temperature of greater than 100° C.

The advantage of contacting the gaseous halide and metal-containing source material together at a temperature of greater than 100° C. can readily be understood by reference to the situation where gaseous chloride is used as the gaseous halide. Under these temperature conditions, water formed as a by-product of metal chloride formation will not condense out (with the attendant risk that it will then form hydrochloric acid with the gaseous chloride) but instead will remain in the gaseous phase with the excess gaseous chloride. This gaseous phase water (steam) can then easily be removed by passing through a sulphuric acid scrubber, leaving a dry gaseous chloride which can be recirculated. In this way, loss of gaseous chloride reagent is minimised and its utilisation maximised as it is used solely for metal chloride formation.

By performing the metal halide formation step in an oxidising environment, for example in a fluidised bed reactor maintained by compressed air, any iron present in the metal-containing source material is converted to iron (III) oxide. As discussed above in connection with the use of gaseous chloride as gaseous halide, any iron (III) chloride formed is not stable above its relatively low boiling point, decomposing to form iron (III)oxide and releasing hydrogen chloride. Wastage of hydrogen chloride through loss to the iron is thereby minimised.

In one embodiment, the oxidising environment is provided by bringing the metal-containing source and gaseous halide into contact in a continuous flow of air.

The metal halide enriched feed produced in step (i) of the process of the present invention may suitably be treated to recover any residual gaseous halide trapped within the feed and also any residual water. In one embodiment, this is achieved by displacing the metal halide enriched feed product to a rotary kiln operated at the same temperature as adopted in the metal halide formation step. Any recovered gaseous halide can then be returned to the reaction vessel used in the metal halide formation stage and recirculated. In this way, losses to the calcine may be significantly reduced.

The (gaseous halide free) metal halide containing product of step (i) is then heated in step (ii) of the process of the present invention to a temperature at or above its vaporisation temperature to form a gaseous metal halide containing product.

In one embodiment, the metal halide (for example, chloride) containing product of step (i) is heated in a fluidised bed reactor maintained at a temperature in the range of 700° C. to 1500° C., typically 1000° C.

The gaseous metal halide product so produced can then be condensed using methods conventional in the art. As the gaseous metal halide stream produced in step (ii) is dry and does not contain any excess gaseous halide, recover of the metal chloride of interest is a simple matter.

In one embodiment, the recovered metal halide may optionally then itself be further refined to extract the metal of interest itself. Conveniently, the metal of interest can be recovered from the metal halide produced by the process of the invention using conventional hydrometallurgical processing techniques.

An apparatus for use according to an embodiment of the process of the invention is illustrated schematically in FIG. 1.

FIG. 1 shows a fluidised bed reactor (2) into which a smelter slag feed material may be fed through an inlet (1). Gaseous halide (for example, gaseous chloride) is introduced into the fluidised bed through a gas and air inlet (7) at the base of the fluidised bed reactor and the gas recirculated through the fluidised bed reactor in a gas recirculation loop (4) by means of a circulation pump (6). The recirculating gases (in the case of gaseous chloride, these will be water formed as a by-product of the metal chloride formation and excess gaseous chloride) are passed through a sulphuric acid scrubber (5), leaving a dry gaseous chloride for recirculation. Metal chloride enriched material is passed through outlet (3) to an intermediate rotary kiln (8) and residual gaseous chloride trapped within the treated feed is recovered, together with any residual water, and returned to the gas recirculation loop (4) by means of recovered gases recirculation loop (9). The gaseous chloride free metal chloride enriched feed is passed to a second (recovery) rotary kiln (10) where the temperature is raised and metal chloride rich vapours passed through exit (11) and collected. Process waste are expelled from the recovery rotary kiln through outlet (12).

Throughout the description and claims of this specification, the words "comprise" and "contain" and variations of the words, for example "comprising" and "comprises", mean "including but not limited to", and do not exclude other moieties, additives, components, integers or steps. The singular encompasses the plural unless the context otherwise requires. In particular, where the indefinite article is used, the specification is to be understood as contemplating plurality as well as singularity, unless the context requires otherwise.

Preferred features of each aspect of the invention may be as described in connection with any of the other aspects.

Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith.

The process of the invention is further illustrated by the following non-limiting example: —

20 g of a lead smelter slag was heated to 350° C. in a fluidised bed reactor in the presence a continuous mixed gas flow of air and hydrogen chloride gas. This was maintained for 3 hours.

After 3 hours the hydrogen chloride gas was removed but the air flow was maintained. The sample was held at 350° C. for a further 1.5 hours and the sample was then subjected to a temperature of 1000° C. for 1.5 hours in a constant air flow.

After cooling, the sample was analysed and compared to the head grade of the feed material and material treated in accordance with the process described in WO 2010/082065A. Five duplicate samples were assessed.

The results obtained, presented below, demonstrate very high extractions of the three target metals of copper, lead and zinc, whilst the iron remained with the calcine waste.

| Analyte | Fe | Cu | Pb | Zn |
|---|---|---|---|---|
| Head Grade | 19.74% | 1.45% | 0.99% | 10.81% |
| New % Process Extraction Conditions | <0.1% | 99.1% | 99.5% | 96.4% |
|  | <0.1% | 98.3% | 99.8% | 95.1% |
|  | <0.1% | 98.0% | 99.7% | 97.5% |
|  | <0.1% | 98.6% | 99.8% | 96.4% |
|  | <0.1% | 99.1% | 99.8% | 97.8% |
| Average | <0.1% | 98.6% | 99.7% | 96.6% |

Comparing these results to those from the samples processed in WO 2010/082065A, it can be seen that similar results were obtained for copper and lead but there is a notable increase in zinc extraction by the process of the present invention and there is a significance difference in the iron extracted. The process of the present invention is more selective with regards to iron and removes any iron contamination issues in the downstream commodity recovery processes.

| Analyte | Fe | Cu | Pb | Zn |
|---|---|---|---|---|
| Head Grade | 19.74% | 1.45% | 0.99% | 10.81% |
| WO % 2010/ Extraction 082065A Conditions | 11.4% | 98.6% | 99.4% | 88.1% |
|  | 10.1% | 99.2% | 99.8% | 89.5% |
|  | 9.2% | 99.0% | 99.7% | 89.0% |
|  | 9.8% | 99.2% | 99.8% | 91.0% |
|  | 8.2% | 99.2% | 99.8% | 89.1% |
| Average | 9.7% | 99.0% | 99.7% | 89.3% |

The invention claimed is:

1. A process for recovering a metal in the form of a metal halide of interest from a metal-containing source, the process comprising the steps of:—
    (i) forming a solid metal halide containing product by contacting the metal-containing source with a gaseous halide in an oxidising environment and at a temperature in the range of from greater than 316° C. up to 350° C.;
    (ii) heating the metal halide containing product formed in step (i) to a temperature at or above the vaporisation temperature of the metal halide of interest to form a gaseous metal halide containing product; and
    (iii) condensing the gaseous metal halide containing product of step (ii) to recover the metal halide of interest.

2. A process according to claim 1, wherein the metal-containing source is a metal ore or a metalliferous waste material.

3. A process according to claim 1 or claim 2, wherein the gaseous halide is a gaseous chloride.

4. A process according to claim 3, wherein the gaseous chloride is gaseous ammonium chloride or gaseous iron (III) chloride.

5. A process according to claim 3, wherein the gaseous chloride is hydrogen chloride gas.

6. A process according to claim 1, wherein in step (i) the metal-containing source and the gaseous halide are brought into contact in a fluidised bed reactor.

7. Process according to claim 6, wherein the fluidised bed is maintained in the presence of air.

8. A process according to claim 1, wherein in step (ii), the metal halide containing product of step (i) is heated to a temperature of from 700° C. to 1500° C.

9. A process according to claim 1, wherein the recovered metal halide of step (iii) is further treated to extract the metal of interest.

* * * * *